(12) United States Patent
Patel

(10) Patent No.: US 8,015,267 B2
(45) Date of Patent: Sep. 6, 2011

(54) METHOD AND SYSTEM FOR SELECTIVELY DISTRIBUTING DATA TO A SET OF NETWORK DEVICES

(75) Inventor: Dipan Patel, London (GB)

(73) Assignee: Accenture Global Services Limited, Dublin (IE)

( * ) Notice: Subject to any disclaimer, the term of this patent is extended or adjusted under 35 U.S.C. 154(b) by 658 days.

(21) Appl. No.: 10/561,428

(22) PCT Filed: Jun. 16, 2004

(86) PCT No.: PCT/GB2004/002570
§ 371 (c)(1),
(2), (4) Date: Mar. 26, 2007

(87) PCT Pub. No.: WO2004/114663
PCT Pub. Date: Dec. 29, 2004

(65) Prior Publication Data
US 2007/0294362 A1 Dec. 20, 2007

(30) Foreign Application Priority Data
Jun. 17, 2003 (GB) .................................. 0314043.12

(51) Int. Cl.
*G06F 15/177* (2006.01)
*G06F 15/173* (2006.01)
*G06F 9/44* (2006.01)
(52) U.S. Cl. ......... 709/220; 709/222; 709/223; 717/172
(58) Field of Classification Search .......... 709/220–226; 717/168, 171–178
See application file for complete search history.

(56) References Cited

U.S. PATENT DOCUMENTS

| 5,627,842 | A  | * | 5/1997  | Brown et al. ................. 714/727 |
| 6,097,940 | A  | * | 8/2000  | Sekiya et al. ................. 455/411 |
| 6,237,061 | B1 | * | 5/2001  | Srinivasan et al. ............ 711/108 |
| 6,434,144 | B1 | * | 8/2002  | Romanov ...................... 370/392 |
| 6,611,832 | B1 | * | 8/2003  | van Lunteren .................... 707/3 |
| 6,976,062 | B1 | * | 12/2005 | Denby et al. ................. 709/220 |
| 2002/0083442 | A1 |   | 6/2002  | Eldering |
| 2003/0041335 | A1 |   | 2/2003  | Patry et al. |

(Continued)

FOREIGN PATENT DOCUMENTS
EP        1189439        3/2002
(Continued)

OTHER PUBLICATIONS

UK PO—Search and examination report, Jul. 31, 2006.
(Continued)

*Primary Examiner* — Joseph E Avellino
*Assistant Examiner* — James Baron
(74) *Attorney, Agent, or Firm* — Fish & Richardson P.C.

(57) ABSTRACT

A method selectively distributes data to a set of devices linked by a network, where each device has at least one unique identifier. The method comprises selecting devices to be members of the set, the set devices being selected to receive the data based on the at least one unique identifier, and distributing data to at least the selected devices, the data including at least one matching key for matching at least a portion of the unique identifier of selected devices. The unique identifier is a device hardware identifier, being a string of bits and the key correlates to at least a portion of the string of bits.

42 Claims, 3 Drawing Sheets

U.S. PATENT DOCUMENTS

| | | | |
|---|---|---|---|
| 2004/0107350 A1* | 6/2004 | Wasilewski et al. | 713/182 |
| 2004/0156508 A1* | 8/2004 | Tada et al. | 380/281 |
| 2004/0199615 A1* | 10/2004 | Philyaw | 709/220 |
| 2004/0255263 A1* | 12/2004 | Ando | 717/100 |
| 2008/0175610 A1* | 7/2008 | Gross et al. | 399/49 |
| 2008/0176510 A1* | 7/2008 | Yuhara et al. | 455/3.02 |

FOREIGN PATENT DOCUMENTS

| | | | |
|---|---|---|---|
| GB | 2403105 A | * | 12/2004 |
| WO | WO 96/41472 | | 12/1996 |
| WO | WO 00/64178 | | 10/2000 |
| WO | WO 01/31920 | | 5/2001 |

OTHER PUBLICATIONS

UK PO—Search and examination report, Sep. 15, 2004.
UK PO—Search and examination report, May 21, 2004.
Office Action in Canadian Application No. 2,529,879, mailed Apr. 1, 2011, 3 pages.
Tanenbaum, Andrew S. "Chapter 5: The Network Layer in the Internet (excerpt) ED", Jan. 1, 1996, Computer Networks (Third Edition), London: Prentice-Hall International; GB, pp. 431-436.
Summons to attend oral proceedings pursuant to Rule 115(1) EPC for European Application No. 04742932.9, dated Jun. 6, 2011, 7 pages.

* cited by examiner

METHOD AND SYSTEM FOR SELECTIVELY DISTRIBUTING DATA TO A SET OF NETWORK DEVICES

TECHNICAL FIELD

The present invention relates to a method and system for selectively distributing data to a set of network devices and will be described in relation to selectively modifying instruction code of devices of subscriber television networks. However, it will be appreciated that the invention is not limited to this particular field of use, but is also applicable to other systems of data processing equipment of which mobile telephone networks and computer networks are further non-limiting examples.

BACKGROUND ART

Networks, such as subscriber television service networks, are typically controlled and run by complex computer networks, where end users access the networks' programming via "set top boxes" (STB) connected to their television, and control the programming using a remote control device. STBs may be used merely for accessing different audiovisual entertainment channels on the end user's television, or for datacasting, internet access, pay per view programs, video telephony, and so on. These STBs typically include flash memory for storing data such as software code to process information sent by the subscriber network, and to provide to the connected television a front end graphical user interface (GUI) for the user to access some functions of the software. Due to the changing and improving nature of the services provided by such networks, the STB software may be updated from time to time.

However, updating software often causes problems. For example, even though new software is thoroughly tested under workshop conditions, unforeseen problems often occur once the software is deployed to live STBs; or functionality of the software may change where end users require additional services to learn how to use the changed software. Since the updating of software is not a common event, the service network operators are typically not resourced to cope with calls from users for help with dealing with the changes or problems. For this reason, it is desirable for software updates to be deployed to a trial batch of users to detect problems before mass installation. This is often achieved in practice by using employees (and perhaps friends of employees) to trial the updated software for a period of time to determine the software's robustness in the field. However, this may not provide a large enough or representative sample of the user base.

Furthermore, as equipment may come from a number of sources over a long period of time, there may be numerous versions of software employed by devices. It is not normally practical to maintain the complex database that would be required to track existing software versions.

Similar problems occur when rolling out computer software updates and patches for computer systems. Typical methods of providing updates and patches include using the internet or CD-ROMs distributed with trade magazines and the like.

Preferred embodiments of the present invention aim to ameliorate one or more of the problems of the prior art or to provide an alternative thereto.

SUMMARY OF THE INVENTION

According to one aspect of the invention there is provided a method of selectively distributing data to a set of devices linked by a network, each said device having at least one unique identifier, the method comprising the steps of:

selecting devices to be members of the set, the set devices being selected to receive the data based on the at least one unique identifier; and distributing data to at least the selected devices, the data including at least one matching key for matching at least a portion of the unique identifier of selected devices.

This method is advantageous in that the distribution of data is controllable and flexible. Preferably the data is broadcast to a plurality of the devices on the network but only selected devices selectively install the data. The data to be distributed may include updates or improvements to code for running the devices.

In a complementary method aspect, there is provided a method of selectively installing data at one of a set of devices linked by a network, each device having a unique identifier, the method comprising determining whether to install the data based on matching at least a portion of the unique identifier to at least one received matching key associated with the data.

Preferably, the unique identifier is independent of the content of the data, and most preferably is a device hardware identifier. Surprisingly, although device hardware identifiers do not have a logical connection with the decision whether or not to update software, and indeed because of this, they can provide a useful means of selecting subsets of a population of devices.

Preferably, the set of devices comprises one of a plurality of substantially arbitrarily partitioned subsets of a population of devices. Alternatively, the set of devices may be randomly selected, or selected by one or more predetermined geographic regions common to the set devices.

Preferably, the data is instruction code, preferably a software update.

In one embodiment, the unique identifier may be a string of characters.

Preferably the identifier is a string of bits or characters, the string being preferably of a first length and the set of devices preferably determined from a shorter length subset of the string of the first length. Typically, the first length is at least about 32 bits. The shorter length subset of the string preferably has a selectable length. By using a selectable length bit string to define the set is advantageous, in that the number of matching devices to be updated can be adjusted. Alternatively the shorter length subset may be a fixed length, such as 16 bits.

Preferably, the step of installing the data is performed after performing one or more predetermined action steps on each device to determine whether or not to install the data. The step(s) may include determining whether a controller of the network has the data and whether the data includes a key or flag corresponding to the device, the key or flag preferably corresponding to the shorter length subset of the longer, first length device identifier.

The action step may be performed only when a device initialisation instruction is performed by the device, or when switching to a power on or standby state. Alternatively, the action step may be performed periodically, or at regular intervals while the device is in communication with the network, or when a user of the device performs a manual check of the network while the device is in communication with the network.

The method may include a confirmation step, after the one or more predetermined action steps, of a user of the device performing a confirmation instruction to download and run the data, if the device has been determined as a member of the set of devices.

Preferably, the one or more predetermined action steps include the steps of:

determining the version of a device data of each respective set device;

comparing the version of the device data with the version of the data to be relayed; and determining whether or not to perform the step of downloading the data, based on the outcome of the step of comparing the versions of the device and modification data. Preferably, the predetermined action steps are performed by the device. Preferably each device is arranged to run a manual update routine for allowing the user to decide whether to download data flagged as user selectable from the networks wherein the manual update routine runs a text routine to determine whether to download data flagged as user selectable. Also preferably the test routine comprises comparing the matching key to the unique identifier.

According to a third aspect of the invention there is provided a device for running data, the device being linked to other devices by a network, the device including:

a processor;

a memory with stored data processable by the processor; and at least one unique identifier, wherein the data stored by the memory includes a routine for checking for update data for the device, and for selectively downloading the data based on at least a portion of the unique identifier, and at least one key associated with the update data. Preferably, the data includes the key or flag and the device selectively downloads the update data when the key correlates to the at least the portion of the unique identifier. Also preferably the unique identifier is a device hardware identifier, and is a string of bits of characters.

Preferably, the devices are set top boxes, and the network is a subscription television service. The set of devices may be selected by determining one or more channels subscribed by and common to users of the respective set devices. In this way, an operator of the subscription television service can send data to users, or subscribers of particular channel packages, such as movie channel packages, or sport channel packages. Examples of such data may include a broadcast message to the subscribers about a particular relevant event on a particular channel, or code for allowing preview access for a limited time period to another channel to which the user does not have a subscription.

Alternatively, the devices may be mobile telephones or telephone base stations and the network may be a mobile telephone network.

Alternatively, the devices may be computers and the network may be a computer network. In this embodiment, the computer network is preferably one or more of a local area network, a wide area network or the Internet.

In another alternate arrangement, the devices may be back to base home security devices and the network may be a back to base security network.

According to a fourth aspect of the invention there is provided a system for selectively distributing data to of a set of devices linked by a network, each said device having at least one unique identifier, the system comprising:

means for selecting devices to be members of the set, the set of devices being selected to receive the data based on respective unique identifiers of the devices;

means for distributing data to at least each selected device, the data including at least one matching key for matching at least a portion of the unique identifier of selected devices; and means for running the data on each respective selected device.

According to a fifth aspect of the invention there is provided a method of updating a device which has an update routine which checks for available updates over a network and selects available updates which are applicable to the device for download, each update having associated therewith an update condition selected from a plurality of predetermined conditions which conditions include at least (1) at least one power change condition and (2) a user-selection condition, the device being arranged to execute a user confirmation routine on selection of an available applicable update associated with a user-selection condition, the method comprising executing a routine which performs a test to determine whether a selective update criterion is met in place of the user confirmation routine and which automatically opts to install the available applicable update if the selective update criterion is met.

This method is advantageous where an operator of the network needs to perform a "retrofit" of a new code or data routine to devices already on the network.

Preferably the device is arranged to execute the routine which performs the test to determine whether a selective update criterion is met. Also preferably performing the test comprises comparing additional update data associated with the available applicable update to device data obtained from the device, and the additional update data. Preferably the additional update data comprises matching key data and the device data comprises a unique identifier of the device. Also preferably performing the test comprises detecting at least a partial match between said matching key data and said unique identifier. The extent of match required for a positive test result may be specified in the additional updated data.

According to a sixth aspect of the invention there is provided a method of providing updated data to a population of devices, the method comprising partitioning the population of devices into subsets, making the updated data available to a first subset, and subsequently making the data available to further subsets, characterised by monitoring the response following making available to the first subset and setting the size of further subsets and/or the rate of making data available to further subsets based on the response.

The size of further subsets may be increased in the event of a low level of response.

Preferably the subsets are defined by specifying a portion of a matching key to match to a unique identifier of each device. The size of each subset may be determined by setting the length of the portion of matching key to match, wherein a shorter matching portion will match a larger number of devices.

Preferably, a longer portion of matching key is used to define a smaller first subset and a shorter portion of matching key is used to define at least one larger further subset.

Preferably, monitoring the response comprises obtaining a measure of response based on user feedback.

According to another aspect of the invention there is provided a computer program or computer program product for selectively distributing data of a set of devices of a network comprising means for performing the method aspects of the invention.

In the specification, unless otherwise stated or apparent from the context, references to STBs are intended to encompass any form of decoder which receives (preferably digital) signals from a medium (satellite, cable, DSL, terrestrial being non-limiting examples) and provides (typically analogue, but digital output is not excluded) video signals for a display device (television, plasma screen, video projector being non-limiting examples). Whilst stand-alone STBs are commonplace, the functionality of the STB may be integrated into a display device (for example a television with built in digital decoding) or other device (for example cable modem or other communication device).

Typical STBs in current use only allow of the order of about 8 megabytes for applications and only have a processor capable of the order of 100 MIPS (million instructions per second) which is an order of magnitude less than typical personal computers. However, the architecture is applicable to other devices, such as hand-held devices (Personal Digital Assistants, or PDA being a non-limiting example), mobile devices, dedicated games or entertainment devices and even in fact to general purpose computers where it is desired to provide an efficient processing architecture.

As will be understood, the term "matching" in the context of the specification and claims is preferably to be understood as a direct match where, for a match to occur, the matching key is identical to a portion of the unique identifier.

BRIEF DESCRIPTION OF THE DRAWINGS

Preferred embodiments of the invention will now be described, by way of example only, with reference to the accompanying drawings, in which.

DETAILED DESCRIPTION OF THE PREFERRED EMBODIMENTS

In the following description, an embodiment is described in the context of a device in the form of a STB for decoding video signals, which is a particularly preferred application. However, the architecture (and portions thereof) may be applied to other network systems, for devices such as mobile telephone devices, handheld devices, games platforms, general purpose computers, GPS automobile security systems, back to base building security systems, or indeed any device having a processor, memory and input and output functions.

Figure 1:
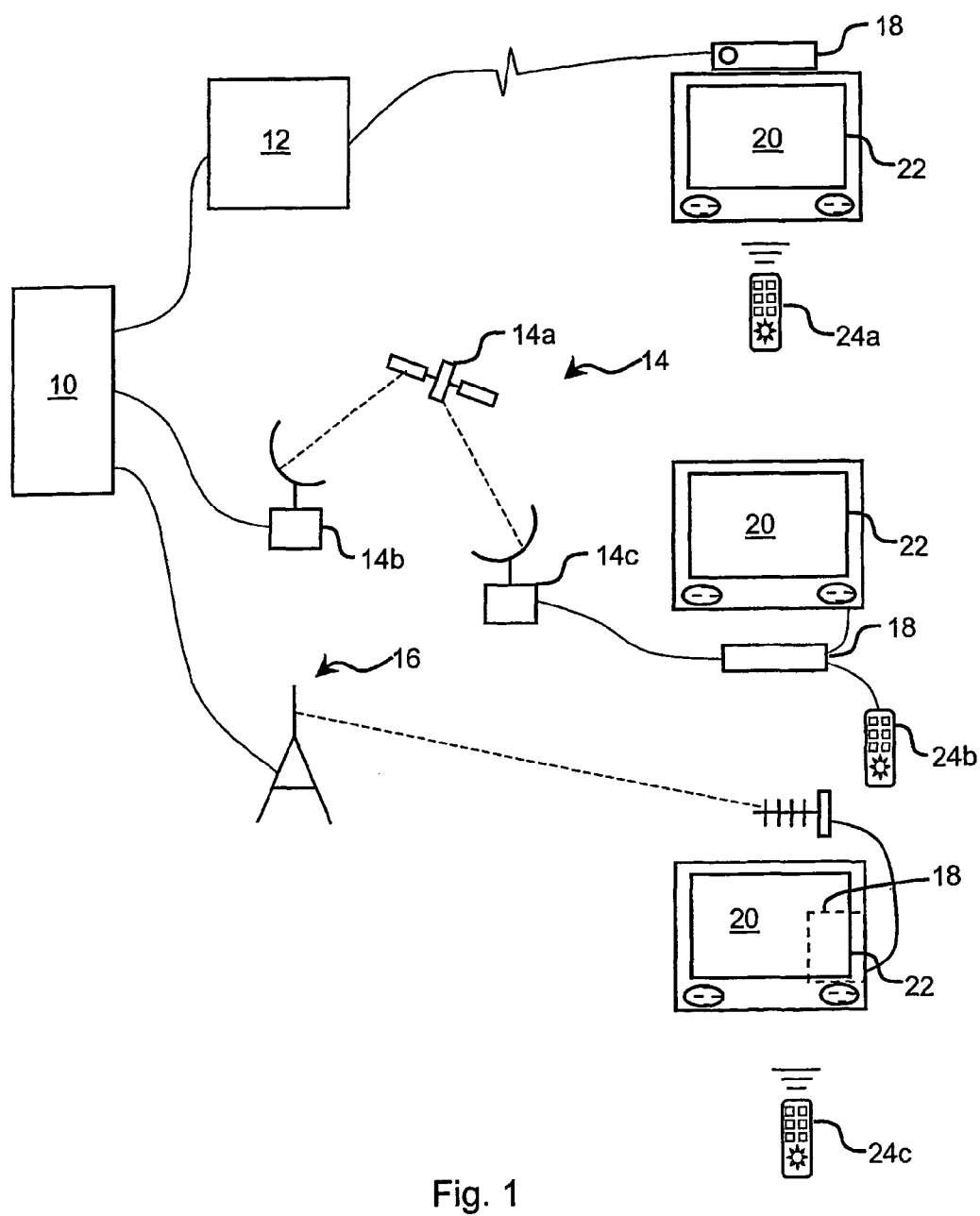
FIG. 1 is a schematic overview of a system for employing the present invention.

Referring to FIG. 1, a preferred embodiment of a method, system, device and computer program or computer program product according to the invention may comprise at least one network controller in the form of a server 10 connected via a communication medium such as a digital subscriber link (DSL, or cable) headend 12, a satellite link 14, a terrestrial transmitter 16, or other communication link (not shown) to devices in the form of STBs 18. The satellite link typically includes a satellite 14a and transmitting and receiving dishes 14b and 14c respectively. The STBs 18 provide video signals to a display device such as a television 20 to be displayed on a screen 22. The STBs 18 receive input signals, for example from an infra-red remote control 24a, a direct coupled joystick or input device 24b or, in the case of a STB 18a integrated with a television 20a, from a master control 24c for the television.

In normal use, the STB 18 decodes video signals received over the communication medium to provide video output, as is well-known in the art. The STBs normally include limited functionality for providing a graphics display, for example to display static configuration and programme menus. Alternatively, the graphics capability is made use of to provide real-time moving video (although the invention can be used to provide static video as well), for example to enable a user to play an arcade-style game.

Figure 2:
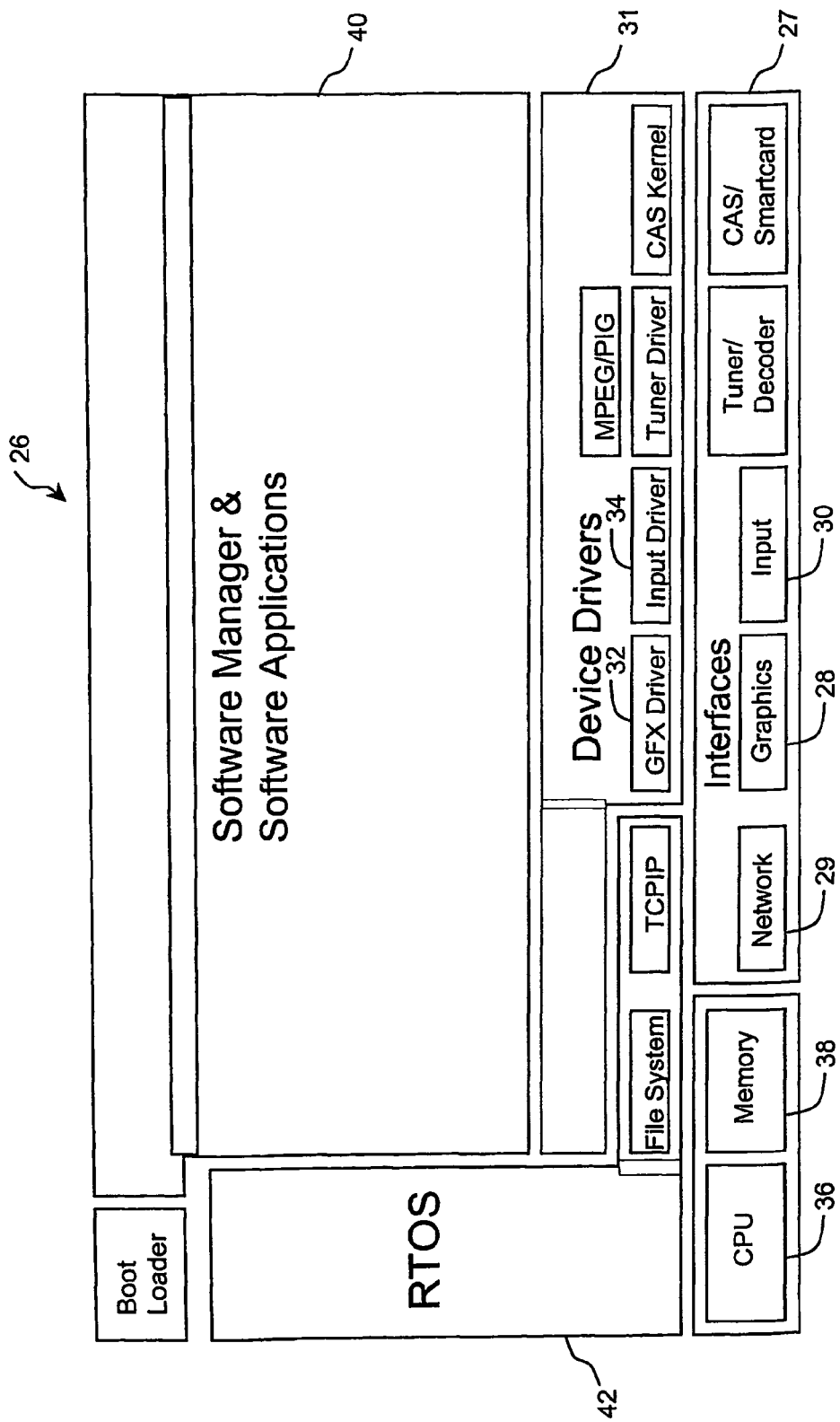
FIG. 2 is a schematic view of the architecture of a STB for employing the present invention.

The architecture of the STB 18 which makes this feasible will be explained with reference to FIG. 2. As is well-known, a STB 18 generally has a hardware platform 26 which provides a variety of interfaces 27, including a graphics interface 28, a network interface 29, an input interface 30 and normally a sound interface (not shown). A variety of standard drivers 31 including a graphics driver 32 and input driver 34 are provided for controlling the interfaces 27. The hardware has a central processing unit (CPU) 36 and memory 38, such as flash memory or other applicable memory types, which runs the software 40, including a real time operating system (RTOS) 42.

In the preferred embodiment of the invention, each STB has a unique hardware identifier being a string of a first length in the form of at least a 32 bit linear string, resulting in a maximum of $2^{32}$, or approximately 4 billion unique identifiers for the STB population.

In alternative embodiments, the unique identifier is in the form of an 8 bit×8 bit (1 byte×1 byte), 2 dimensional array string, or is in the form of a 64 bit linear string, each resulting in a STB population maximum of $2^{64}$ unique identifiers. Such a configuration would ensure no two STBs share the same unique identifier. Other embodiments of STBs may have unique identifiers with larger or smaller bit strings, or with other strings, such as alphanumeric strings. The identifier may not be truly globally unique in certain cases.

In another alternative embodiment, each STB 18 may be supplied a downloaded unique identifier, such as a subscriber number, to be written to its memory.

In yet another alternative embodiment, the unique identifier may be a whole or part hash value of a predetermined portion of data on the STB 18. The predetermined portion of data may include user details held by the memory 38, or data relating to the user's subscription of service that they are using the STB for.

A preferred embodiment of a method according to the present invention will now be described with reference to FIGS. 1 to 3. The server 10 sends multiple data streams at different frequencies relating to different channels throughout the network to connected STBs. A channel may be for broadcasting audiovisual data of popular television programs, or alternatively for data streaming of teletext information, the Internet or pay-per-view programs. Typically, television programs and teletext are continuously broadcast, whereas the Internet is interactive, allowing uploading as well as downloading of data. Pay-per-view programs may be "on demand", requested by the user to be broadcast, continuously broadcast, but restricted to access by relevant subscribers.

Depending on a subscription type or level of a STB user, each respective STB contains software code to decode the data streams or channels to which the user has subscribed. In addition to subscribed channels, the Internet, etc, the server 10 may from time to time send data streams of STB data in the form of software code updates on one or more channels, where the software relates to a change in user subscription, or a change to the functionality of the STB, such as its graphical user interface. It is the method and system by which the latter data stream is transmitted which is the principal concern of the preferred embodiment of the present invention.

Prior to sending software code updates, the modification or updated code is normally tested by the network operator for robustness. Depending on the nature of the updated code, the server will roll out the code, in accordance with the preferred embodiment, to sets of subscribers over time. This has many advantages. For example, depending on the change to functionality of the STB made by the new code, network users will invariably contact the network operator with questions regarding the use of the STB. Therefore, in spreading out the roll out of updated code over time, the impact on the network operator's resources for helping the subscribers is also spread out over time, ensuring a more consistent use of such resources. Or, if there are problems with updated code, the number of updated STBs affected by the update is controlled to update a manageable portion of network subscribers. The rollout can then be stopped, and new update code repaired.

Figure 3:
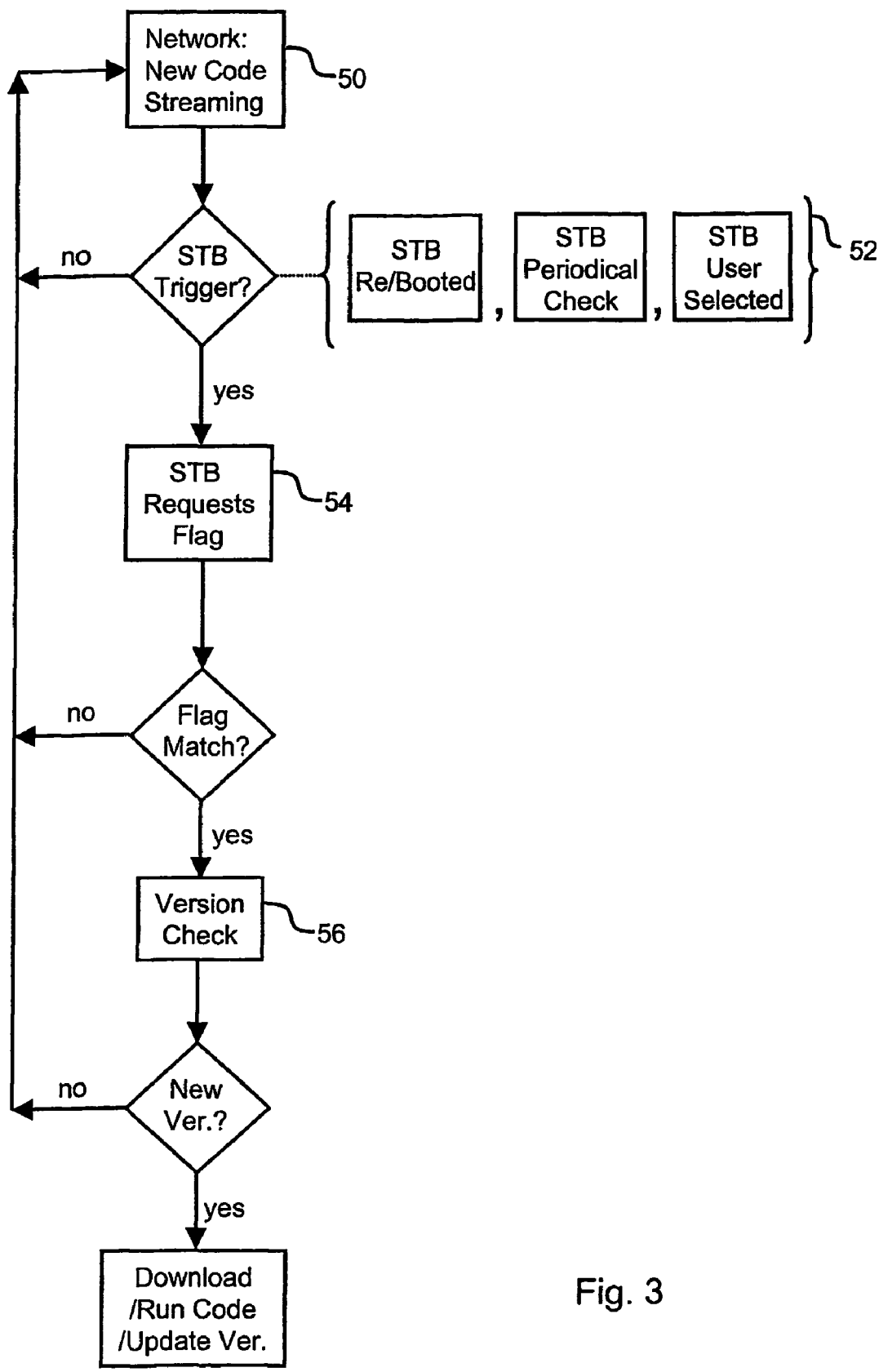
FIG. 3 is flow diagram of a preferred embodiment of the present invention.

Prior to rolling out the updated code, the server 10 determines a 16-bit string to be a flag included with the updated code, and then streams the update code on a preselected channel (FIG. 3, step 50). As illustrated in FIG. 3, after occurrences of a STB trigger 52, resident software code on the STB tells the STB to run a check 54 of the server 10 to see if there are any code updates where the 16-bit string flag matches the first 16 bits of the unique identifier of the STB. If there is no match, the STB continues to function as normal. If there is a flag match, and the software code is an update of code existing on the STB 18, the STB then checks 56 whether the version of the update code is newer, older or the same as the STB's version of the existing code. If newer, the STB 18 downloads and runs the code update from a predetermined channel where the code is being constantly streamed. During or once the code has been downloaded, the version of the updated code is written to the STB memory 38. Alternatively, the code may be an initial instruction to the STB 18 that another instruction code will be available on a predetermined channel at a future predetermined time, such as a week later for example, and that the STB in question is to download and run the other instruction code from the predetermined channel at the predetermined time. Alternatively, steps 54 and 56 occur simultaneously.

There are three main triggers 52 for the STB to check the network for code updates. The first trigger is on boot or reboot of the STB 18. The second trigger is when, with the STB 18 in use, resident code on the STB 18 runs a timed routine asking the server 10 whether a code update is available containing a matching flag. The third trigger is where the user manually asks the server, via a STB GUI function or physical button on the STB 18 or remote controller 24*a-c*, whether a code update is available containing a matching flag.

In all the triggers 52 described above, the user may be given the option to confirm the downloading and running of the code update. Alternatively, the STB 18 will automatically download and run the code update without the user's input or knowledge. In an alternative embodiment, the code includes a secondary flag which tells the STB 18 a predetermined future time when the update code will be available for download.

Depending on the number of subscribers, approximately 1 in 65536 ($2^{16}$) subscribers would receive the code with the above method, due to the flag being 16-bit. This would allow the network operator to roll out new or updated code to a set, or portion, of the users, where the set is approximately 1 in 65536. Once feedback as to the success of the take-up of code of the set has been determined, the flag can be changed to another 16-bit string to allow download and running of the code by a different set of users.

As will be appreciated by the skilled person, depending on the set size required, in alternative embodiments the flag may be larger or smaller, as required. This covers the situation where, if the unique identifier is large enough, a single STB can be targeted for downloading of code, where the flag is identical to the unique identifier of the single STB to be targeted. It also covers the situation where the flag is 1-bit, thus targeting approximately half the STB population. In the example of targeting a single STB, this may be used where only a single user requires a code update, for example should an unusual error have occurred in the download and/or running of an update code, or should that user elect to change their subscription service.

The same or shorter length subset of the string may alternatively be in the form of a string having a variable length over the period of the roll out of the new data. For example, the network operator may determine to rollout new data to a 1 in $2^{16}$ set of STBs, by determining a 16 bit flag. If over a predetermined time frame the network operator receives more complaints or query from STB users than it is possible for resources to effectively deal with, the operator may choose to roll out the next stage of the new data to a smaller set portion of the users, say 1 in $2^{18}$ users, or to delay or halt roll out. If over a predetermined time frame the network operator receives less feedback from STB users than a threshold amount, the operator may choose to roll out the next stage of the new data to a larger set portion of the users and advantageously the software automatically chooses the subset, say 1 in $2^4$ users, using a 4 bit flag. This can provide effective control of network resources in dealing with rolling out of new data.

In another alternative embodiment of the invention, STBs 18 are distributed to users such that the first 16-bit string of the unique identifier is determined based on more systematically distributed data, known by the network operator to correspond to a known criteria, such as geographical region or, particularly in the example of STBs used for television subscriptions, preferred program genre. In this way code updates can be rolled out by region or by program preference. This has the advantage that regional or program specific code updates can be targeted to users who fall into appropriate regional or program specific categories.

In reality, there are already many STBs 18 in use in the market place. Many of these have resident factory installed software code that determines when the STB will check for and download updated data or software code. The STB checks for new code on each boot, reboot/reset, or when manually requested by the user. If, on boot, etc, a newer version of code is available, a download condition is checked to see if the STB is in the correct state to download the new software. The available states for downloading, depending on the needs of the network operator, include: immediate download; on power up or next boot or reset of the STB; when the STB is put into a standby state; or when manually requested by the user.

Manual requesting of new data or software is a feature rarely used, as it is rarely related to the user as being an available feature.

This resident boot code is therefore quite limiting to the network operator who may want or need to have STB data or software updated, but will be unsure as to when the STB is likely to be booted or rebooted/reset to enable initiation of a download.

Therefore, in another embodiment of the invention, there is a method of updating a STB 18 which has an update routine which checks for available updates over the network and selects available updates which are applicable to the STB for download. Each update has associated therewith an update condition selected from a plurality of pre-determined conditions. The conditions include at least:

1. at least one power change condition (for example, detection of a switch to or from a standby condition or a hard power-up condition);
2. a user-selection condition; and 3. an immediate installation condition signifying that an available applicable update is to be applied without waiting for a power change condition or user selection.

The STB is arranged to execute a user confirmation routine on selection of an available applicable update associated with a user-selection condition. In this method, the STB is also arranged to execute a routine, in place of the user confirmation routine, the routine performing a test to determine whether a selective update criterion is met. Also, this routine automatically opts to install the available applicable update if the selective update criterion is met. In an alternative embodiment, the test performing routine is arranged to revert to requesting user confirmation in the absence of data specifying the selective update criterion.

Performing the test also comprises comparing a matching key in the form of a flag associated with the available applicable update to the unique identifier of the STB in question. The extent of positive match between the flag and unique identifier is specified in the additional update data. As with previously described embodiments, the unique identifier may be 32 bits, and the flag specified may be a 16 bit flag, to be potentially matched to the first 16 bits of the unique identifier.

This embodiment can be used in conjunction with earlier described embodiments to allow for downloading of new data to a set of STBs, where the set is based on a correlation between the STBs' respective unique identifiers and a key in the new data.

It will be apparent to those skilled in the art that alternative embodiments of the invention are applicable to different types of networks. For example, the invention may be applied to a mobile telephone network. In this embodiment, the server communicates with a plurality of subscribed mobile telephones via landline telephone substations and mobile telephone tower substations. The server can then roll out updated software, code or data using a method corresponding to the method described above with respect to STBs. Similarly, each telephone would preferably have a 2-byte, or 16 bit unique identifier, and there would be three main triggers for a mobile telephone connected to the network to download data, software, etc where the triggers correspond to the three triggers described above in reference to STBs. The first trigger would be turning on the telephone, the second trigger would be a timed routine run by the telephone and the third trigger would be a manual request by the telephone user, via the user interface on the telephone.

Other embodiments suited to the use of the invention include local area computer networks (LANs); wide area computer networks (WANs); computers connected to the Internet; landline (terrestrial) video/telephones; handhelds, or personal digital assistants (PDAs); back to base alarm systems for houses and commercial properties; GPS, satellite or mobile telephone connected back to base car alarm systems, and so on.

While the present invention has been described in its preferred embodiments, it is to be understood that the words which have been used are words of description rather than limitation and that changes may be made to the invention without departing from its scope as defined by the appended claims.

The text of the abstract filed herewith is repeated here as part of the specification.

A method selectively distributes data to a set of devices linked by a network, where each device has at least one unique identifier. The method comprises selecting devices to be members of the set, the set devices being selected to receive the data based on the at least one unique identifier, and distributing data to at least the selected devices, the data including at least one matching key for matching at least a portion of the unique identifier of selected devices. The unique identifier is a device hardware identifier, being a string of bits and the key correlates to at least a portion of the string of bits.

The invention claimed is:

1. A method comprising:
   receiving, by a set top box, update code streamed to the set top box by a server on a predetermined channel;
   generating, by the set top box, a trigger to check whether the set top box is to invoke the update code that is streamed to the set top box by the server on the predetermined channel;
   receiving, by the set top box in response to the trigger, an m-bit update flag included in the update code, wherein the m-bit flag does not uniquely identify the set top box;
   accessing, by the set top box in response to the trigger, an n-bit unique hardware identifier assigned to the set top box;
   comparing, within the set top box, the m-bit update flag to a predetermined portion of the n-bit unique hardware identifier, wherein n is greater than m;
   determining, based on comparing the m-bit update flag to the predetermined portion of the n-bit unique hardware identifier, that the m-bit update flag matches the predetermined portion of the n-bit unique hardware identifier;
   selectively invoking, by the set top box, the first update code based on determining that the m-bit update flag matches the predetermined portion of the m-bit unique hardware identifier.

2. The method of claim 1, further comprising:
   determining, in response to determining that the m-bit update flag matches the predetermined portion of the n-bit unique hardware identifier, that the update code is a newer version of code that exists on the set top box, wherein the update code is selectively invoked based on determining that the update code is a newer version of code that exists on the set top box.

3. The method of claim 1, further comprising determining that the set top box has been booted or rebooted, wherein the trigger is generated based on determining that the set top box has been booted or rebooted.

4. The method of claim 1, further comprising determining that a predetermined period of time has elapsed, wherein the trigger is generated based on determining that the predetermined period of time has elapsed.

5. The method of claim 1, further comprising receiving a user selection, wherein the trigger is generated based on receiving the user selection.

6. The method of claim 1, further comprising receiving a confirmation from the user that the update code is to be invoked, wherein the update code is invoked based on receiving the confirmation from the user.

7. The method of claim 1, wherein invoking the update code further comprises identifying a future predetermined time in which the set top box is to download and run other code from the predetermined channel.

8. A method comprising:
   determining, by a server, a first quantity of set top boxes to update from a plurality of set top boxes;
   determining a quantity, n, of bits in an n-bit unique hardware identifier assigned to each set top box;
   selecting, by the server, a value, m, based on the first quantity of set top boxes to update and the quantity, n, wherein the value, m, is less than the quantity, n;
   generating, by the server, an m-bit update flag;

including, by the server, the m-bit update flag in update code; and streaming, by the server, the update code, including the m-bit update flag, to the plurality of set top boxes on a predetermined channel.

9. The method of claim 8, further comprising:

after streaming the update code to the set top boxes, determining a quantity of users that have provided feedback for the update code.

10. The method of claim 9, further comprising:

determine a second quantity of set top boxes to update from the plurality of set top boxes based on the quantity of users that have provided feedback for the update code;

select a value, o, based on the second quantity of set top boxes to update and the quantity, n, where the value, o, is less than the quantity, n;

generate an o-bit update flag;

include the o-bit update flag in update code; and stream the update code, including the o-bit update flag, to the plurality of set top boxes on the predetermined channel.

11. A system comprising:

a set top box; and a non-transitory computer-readable medium coupled to the set top box having instructions stored thereon which, when executed by the set top box, cause the set top box to:

receive update code streamed to the set top box by a server on a predetermined channel;

generate a trigger to check whether the set top box is to invoke the update code that is streamed to the set top box by the server on the predetermined channel;

receive, in response to the trigger, an m-bit update flag included in the update code, wherein the m-bit flag does not uniquely identify the set top box;

access, in response to the trigger, an n-bit unique hardware identifier assigned to the set top box;

compare the m-bit update flag to a predetermined portion of the n-bit unique hardware identifier, wherein n is greater than m;

determine, based on comparing the m-bit update flag to the predetermined portion of the n-bit unique hardware identifier, that the m-bit update flag matches the predetermined portion of the n-bit unique hardware identifier;

selectively invoke the update code based on determining that the m-bit update flag matches the predetermined portion of the m-bit unique hardware identifier.

12. The system of claim 11, wherein the instructions further cause the set top box to:

determine, in response to determining that the m-bit update flag matches the predetermined portion of the n-bit unique hardware identifier, that the update code is a newer version of code that exists on the set top box, wherein the update code is selectively invoked based on determining that the update code is a newer version of code that exists on the set top box.

13. The system of claim 11, wherein the instructions further cause the set top box to determine that the set top box has been booted or rebooted, wherein the trigger is generated based on determining that the set top box has been booted or rebooted.

14. The system of claim 11, wherein the instructions further cause the set top box to determine that a predetermined period of time has elapsed, wherein the trigger is generated based on determining that the predetermined period of time has elapsed.

15. The system of claim 11, wherein the instructions further cause the set top box to receive a user selection, wherein the trigger is generated based on receiving the user selection.

16. The system of claim 11, wherein the instructions further cause the set top box to receive a confirmation from the user that the update code is to be invoked, wherein the update code is invoked based on receiving the confirmation from the user.

17. The system of claim 11, wherein invoking the update code further comprises identifying a future predetermined time in which the set top box is to download and run other code from the predetermined channel.

18. A system comprising:

a server; and a non-transitory computer-readable medium coupled to the server having instructions stored thereon which, when executed by the server, causes the server to:

determine a first quantity of set top boxes to update from a plurality of set top boxes;

determine a quantity, n, of bits in an n-bit unique hardware identifier assigned to each set top box;

select a value, m, based on the first quantity of set top boxes to update and the quantity, n, wherein the value, m, is less than the quantity, n;

generate an m-bit update flag;

include the m-bit update flag in update code; and stream the update code, including the m-bit update flag, to the plurality of set top boxes on a predetermined channel.

19. The system of claim 18, wherein instructions further cause the server to:

determine, after streaming the update code to the set top boxes, a quantity of users that have provided feedback for the update code.

20. The system of claim 19, wherein the instructions further cause the server to:

determine a second quantity of set top boxes to update from the plurality of set top boxes based on the quantity of users that have provided feedback for the update code;

select a value, o, based on the second quantity of set top boxes to update and the quantity, n, where the value, o, is less than the quantity, n;

generate an o-bit update flag;

include the o-bit update flag in update code; and stream the update code, including the o-bit update flag, to the plurality of set top boxes on the predetermined channel.

21. A non-transitory computer storage medium encoded with a computer program, the program comprising instructions that when executed by a set top box causes the set top box to:

receive update code streamed to the set top box by a server on a predetermined channel;

generate a trigger to check whether the set top box is to invoke the update code that is continuously streamed to the set top box by a server on a predetermined channel;

receive, in response to the trigger, an m-bit update flag included in the update code, wherein the m-bit flag does not uniquely identify the set top box;

access, in response to the trigger, an n-bit unique hardware identifier assigned to the set top box;

compare the m-bit update flag to a predetermined portion of the n-bit unique hardware identifier, wherein n is greater than m;

determine based on comparing the m-bit update flag to the predetermined portion of the n-bit unique hardware identifier, that the m-bit update flag matches the predetermined portion of the n-bit unique hardware identifier;
selectively invoke, invoke by the set top box, the update code based on determining that the m-bit update flag matches the predetermined portion of the m-bit unique hardware identifier.

22. The non-transitory computer storage medium of claim 21, wherein the instructions further cause the set top box to:
determine, in response to determining that the m-bit update flag matches the predetermined portion of the n-bit unique hardware identifier, that the update code is a newer version of code that exists on the set top box, wherein the update code is selectively invoked based on determining that the update code is a newer version of code that exists on the set top box.

23. The non-transitory computer storage medium of claim 21, wherein the instructions further cause the set top box to determine that the set top box has been booted or rebooted, wherein the trigger is generated based on determining that the set top box has been booted or rebooted.

24. The non-transitory computer storage medium of claim 21, wherein the instructions further cause the set top box to determine that a predetermined period of time has elapsed, wherein the trigger is generated based on determining that the predetermined period of time has elapsed.

25. The non-transitory computer storage medium of claim 21, wherein the instructions further cause the set top box to receive a user selection, wherein the trigger is generated based on receiving the user selection.

26. The non-transitory computer storage medium of claim 21, wherein the instructions further cause the set top box to receive a confirmation from the user that the update code is to be invoked, wherein the update code is invoked based on receiving the confirmation from the user.

27. The non-transitory computer storage medium of claim 21, wherein invoking the update code further comprises identifying a future predetermined time in which the set top box is to download and run other code from the predetermined channel.

28. A non-transitory computer storage medium encoded with a computer program, the program comprising instructions that when executed by a server causes the server to:
determine a first quantity of set top boxes to update from a plurality of set top boxes;
determine a quantity, n, of bits in an n-bit unique hardware identifier assigned to each set top box;
select a value, m, based on the first quantity of set top boxes to update and the quantity, n, wherein the value, m, is less than the quantity, n;
generate an m-bit update flag;
include the m-bit update flag in update code; and
stream the update code, including the m-bit update flag, to the plurality of set top boxes on a predetermined channel.

29. The non-transitory computer storage medium of claim 28, wherein the instructions further cause the server to:
determine, after streaming the update code to the set top boxes, a quantity of users that have provided feedback for the update code.

30. The non-transitory computer storage medium of claim 29, wherein the instructions further cause the server to:
determine a second quantity of set top boxes to update from the plurality of set top boxes based on the quantity of users that have provided feedback for the update code;
select a value, o, based on the second quantity of set top boxes to update and the quantity, n, where the value, o, is less than the quantity, n;
generate an o-bit update flag;
include the o-bit update flag in update code; and
stream the update code, including the o-bit update flag, to the plurality of set top boxes on the predetermined channel.

31. The method of claim 8, wherein the n-bit unique hardware identifier corresponds to systematically distributed data that corresponds to a known criteria.

32. The method of claim 31, wherein the known criteria is one of a geographic region or a preferred program genre.

33. The system of claim 18, wherein the n-bit unique hardware identifier corresponds to systematically distributed data that corresponds to a known criteria.

34. The system of claim 33, wherein the known criteria is one of a geographic region or a preferred program genre.

35. The non-transitory computer storage medium of claim 28, wherein the n-bit unique hardware identifier corresponds to systematically distributed data that corresponds to a known criteria.

36. The non-transitory computer storage medium of claim 35, wherein the known criteria is one of a geographic region or a preferred program genre.

37. The method of claim 10, wherein:
the type of feedback is negative,
the second quantity of set top boxes is less than the first quantity of set top boxes based on the negative feedback, and
the value, o, is less than the value, m.

38. The method of claim 10, wherein:
the type of feedback is positive,
the second quantity of set top boxes is greater than first quantity of set top boxes based on the positive feedback, and
the value, o, is greater than the value, m.

39. The system of claim 20, wherein:
the type of feedback is negative,
the second quantity of set top boxes is less than the first quantity of set top boxes based on the negative feedback, and
the value, o, is less than the value, m.

40. The system of claim 20, wherein:
the type of feedback is positive,
the second quantity of set top boxes is greater than first quantity of set top boxes based on the positive feedback, and
the value, o, is greater than the value, m.

41. The non-transitory computer storage medium of claim 30, wherein:
the type of feedback is negative,
the second quantity of set top boxes is less than the first quantity of set top boxes based on the negative feedback, and
the value, o, is less than the value, m.

42. The non-transitory computer storage medium of claim 30, wherein:
the type of feedback is positive,
the second quantity of set top boxes is greater than first quantity of set top boxes based on the positive feedback, and
the value, o, is greater than the value, m.

* * * * *

UNITED STATES PATENT AND TRADEMARK OFFICE
CERTIFICATE OF CORRECTION

| | | |
|---|---|---|
| PATENT NO. | : 8,015,267 B2 | Page 1 of 1 |
| APPLICATION NO. | : 10/561428 | |
| DATED | : September 6, 2011 | |
| INVENTOR(S) | : Dipan Patel | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 689 days.

Signed and Sealed this
Twenty-seventh Day of March, 2012

David J. Kappos
*Director of the United States Patent and Trademark Office*